United States Patent [19]

Goto

[11] 4,095,462

[45] Jun. 20, 1978

[54] DEVICE FOR DETECTING THE AIR-FUEL RATIO OF AN INTERNAL COMBUSTION ENGINE

[75] Inventor: Kenji Goto, Susono, Japan

[73] Assignee: Toyota Jidosha Kogyo Kabushiki Kaisha, Toyota, Japan

[21] Appl. No.: 725,840

[22] Filed: Sep. 23, 1976

[30] Foreign Application Priority Data

May 25, 1976 Japan .................................. 51-59578

[51] Int. Cl.² .......................................... G01M 15/00
[52] U.S. Cl. ........................................ 73/116; 73/27 R
[58] Field of Search ............. 73/15 A, 116, 204, 27 R; 23/232 E, 254 E; 60/276

[56] References Cited

U.S. PATENT DOCUMENTS

| 3,841,283 | 10/1974 | Wood | 60/276 X |
| 4,005,689 | 2/1977 | Barnard | 60/276 X |

Primary Examiner—Jerry W. Myracle
Attorney, Agent, or Firm—Stevens, Davis, Miller & Mosher

[57] ABSTRACT

A device for detecting the air-fuel ratio of the mixture supplied to an internal combustion engine of the type including an exhaust gas recirculation system for recirculating a part of the exhaust gas into an intake passage. The device comprises means for detecting the thermal conductivity of the exhaust gas, an electric circuit having a battery which supplies an electric current to said thermal conductivity detecting means and means for measuring the changes of the electric resistance of said thermal conductivity detecting means.

3 Claims, 4 Drawing Figures

DEVICE FOR DETECTING THE AIR-FUEL RATIO OF AN INTERNAL COMBUSTION ENGINE

This invention generally relates to a device for detecting the air-fuel ratio of the mixture supplied to an internal combustion engine and, more particularly, to such a device having means for detecting the thermal conductivity of the exhaust gas.

Presently, the problem with respect to the exhaust gas discharged from motor vehicles is significant and various methods have been proposed for reducing the poisonous components contained in the exhaust gas, such as Hydrocarbons, CO, $NO_x$, etc. Based on these methods, it is already known in the art to use as a catalytic converter, a so called three way catalytic converter which reduces three components at the same time. In such a catalytic converter the unburnt mixture in the exhaust gas is reacted and the deoxidation of oxide $NO_x$ occurs simultaneously, under a condition wherein the fresh air-fuel weight ratio of the mixture introduced to the internal combustion engine is controlled so as to be close as possible to a theoretical value and the rate of oxygen contained in the exhaust gas is maintained within a suitable range. That is to say, the oxidation and the deoxidation of the exhaust gas are carried out at the same time and, thus, the poisonous components, such as HC, CO and $NO_x$, are simultaneously reduced by the three way catalytic converter. Such method, however, requires that the air-fuel ratio of the mixture introduced to the internal combustion engine be controlled so as to be as close as possible to the theoretical value and, for this purpose, it is necessary to provide means for accurately detecting the air-fuel ratio of the mixture.

It is conventionally well known to those skilled in the art to detect the air-fuel ratio of the mixture by measuring the concentration of oxygen contained in the exhaust gas by means of an oxygen sensor (namely, $O_2$ sensor) provided in the exhaust passage. This is because it is difficult to directly detect the air-fuel ratio at the suction side of the internal combustion engine. The oxygen sensor, however, is not satisfactory with regard to accuracy and durability.

Accordingly, it is the principal object of the present invention to provide a new and improved air-fuel ratio detecting device which is satisfactory with regard to accuracy and durability.

Another object of the present invention is to provide an air-fuel detecting device in which the air-fuel ratio of the mixture is detected in the exhaust side of the internal combustion engine in the same way as the conventional oxygen sensor, but which has means for measuring the changes of the thermal conductivity of the exhaust gas.

These objects of the present invention will be readily evident from the following description together with the accompanying drawings wherein.

Figure 1:
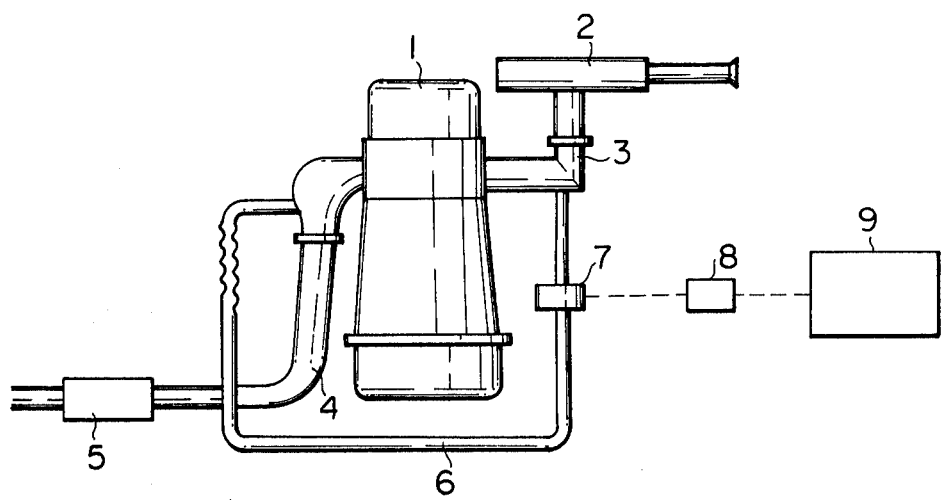
FIG. 1 is a schematic illustration of an internal combustion engine for motor vehicles having an air-fuel ratio detecting device according to this invention.

Referring now to the drawings, FIG. 1 illustrates an internal combustion engine having a device for detecting the air-fuel ratio of the mixture according to this invention. The air clarified by an air cleaner 2 is mixed with a fuel in an intake passage 3 and the air-fuel mixture is introduced to an internal combustion engine body 1. After the combustion of the mixture, the exhaust gas is discharged through an exhaust passage 4, which has therein a three way catalytic converter 5 for treating the exhaust gas in the manner described above. This internal combustion engine comprises an exhaust gas recirculation system and is, thus, provided with an exhaust gas recirculation passage 6, generally called an E.G.R. line. This E.G.R. line 6 takes out a part of the exhaust gas from the exhaust passage 4 and recirculates it to the intake passage 3. A fuel supplying installation, not shown in the drawings, is any one of the conventionally well known types and can be either of a carburetor type or a fuel injection type.

In the embodiment shown in FIG. 1, the E.G.R. line 6 is provided with a thermal conductivity detecting member 7, such as for example a hot-wire resistance, which changes its value in accordance with the changes of the thermal conductivity of the exhaust gas in the E.G.R. line 6. The resistance value is amplified by an amplifier 8 and transmitted to a measuring device 9.

Figure 2:
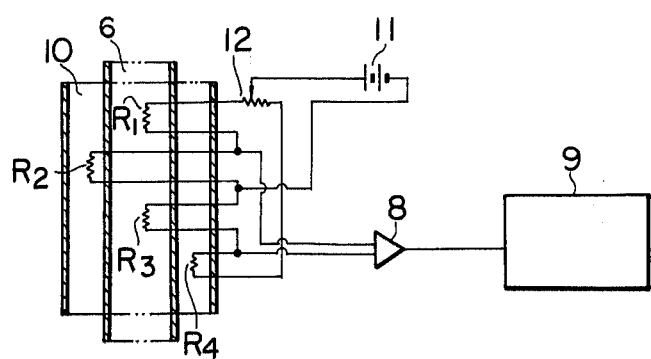
FIG. 2 shows an electric circuit of the air-fuel ratio detecting device of this invention.
Figure 3:
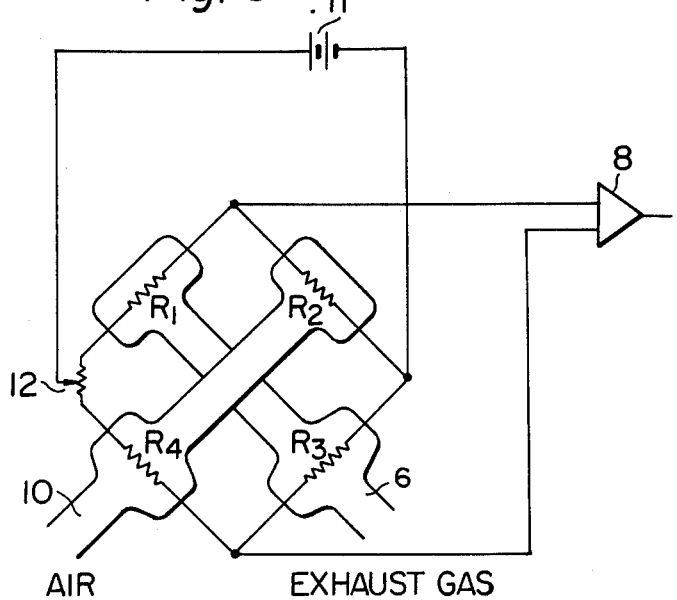
FIG. 3 shows a bridge electric circuit of the present device.

In the embodiment of the present invention shown in FIG. 2, an air passage 10 is formed around the exhaust gas recirculation passage 6. The temperature of the air in the air passage 10 is maintained the same as that of the exhaust gas in the exhaust gas recirculation passage 6 by any way, not shown, known in the art. The means for detecting the thermal conductivity of the exhaust gas consists of four hot-wire resistance elements, two of them $R_1$ and $R_3$ being located in the exhaust passage 4 and the remaining two elements $R_2$ and $R_4$ being located in the air passage 10. These four hot-wire resistance elements are connected to each other and constitute a bridge electric circuit as shown in FIG. 3. Under normal conditions, that is to say in the atmospheric conditions, each of the hot-wire resistance elements $R_1$, $R_2$, $R_3$ and $R_4$ shows an equal resistance value.

The input of the bridge circuit, as shown in FIGS. 2 and 3, is connected to a battery 11 through an adjustable resistance 12 and the output thereof is connected to a measuring device 9 through an amplifier 8. Therefore, when there is no difference between the thermal conductivities of the exhaust gas in the exhaust passage 4 and the air in the air passage 10, the hot-wire resistance elements $R_1$, $R_2$, $R_3$ and $R_4$ indicate the same resistance values and, thus, the output electric power of the bridge circuit is zero.

However, if the values of the hot-wire resistance elements $R_1$ and $R_3$ change while the values of the elements $R_2$ and $R_4$ remain constant, due to a difference between the thermal conductivities of the exhaust gas and the air, a small electric current is generated at the output of the bridge circuit. The small electric current is amplified by the amplifier 8 and measured by the measuring device 9. In this way, the values of the hot-wire resistance elements $R_1$ and $R_3$ located in the exhaust passage 4 change in accordance with the condition of the exhaust gas, namely with the changes of the thermal conductivity thereof.

Figure 4:
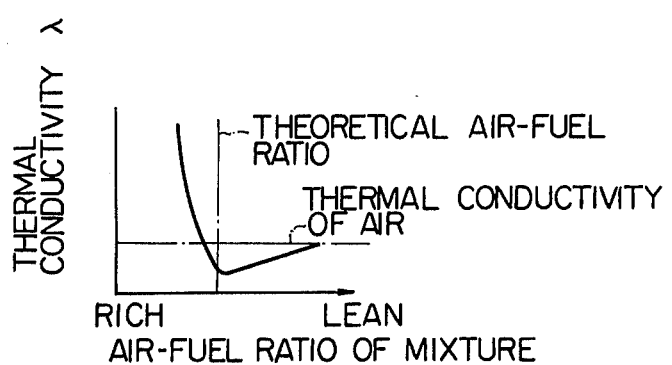
FIG. 4 is a diagram showing the relationship of the thermal conductivity of the exhaust gas to the air-fuel ratio of the mixture.

Now, such phenomenon is described that the thermal conductivity of the exhaust gas changes. FIG. 4 is a diagram showing the relationship of the thermal conductivity ($\lambda$) of the exhaust gas to the air-fuel ratio of the mixture. It is apparent from the diagram that the thermal conductivity of the exhaust gas abruptly increases when the air-fuel ratio of the mixture displaces to the rich region from the theoretical air-fuel ratio. The reason why the thermal conductivity increases is that a large amount of hydrogen is contained in the exhaust gas when the air-fuel ratio of the mixture is in the rich region and, thus, the hydrogen is reacted and then the thermal conductivity ($\lambda$) of the exhaust gas increases to a large extent. Contrary to this, smaller amounts of hydrogen exsist in the exhaust gas when the air-fuel ratio of the mixture is in the lean region. Thus, the existence of hydrogen in the exhaust gas results increasing the thermal conductivity to a large extent, so that the hot-wire resistance elements $R_1$ and $R_3$ change their resistance values. Therefore, the bridge circuit serves as a detector for physically detecting the existence of hydrogen in the exhaust gas. That is to say, if the air-fuel ratio of the mixture changes from the theoretical value, the electric balance of the bridge circuit is lost. For this purpose, the hot-wire resistance elements $R_1$, $R_2$, $R_3$ and $R_4$, shown in FIGS. 2 and 3, must be made from some materials that are sensitive to the thermal conductivities. It is preferable that the hot-wire resistance elements $R_1$ and $R_3$, located in the exhaust passage 4, be coated with anti-corrosive material, such as a ceramic, so as not to be corroded by the exhaust gas.

As described above, a device for detecting the air-fuel ratio of the mixture according to this invention, which is satisfactory in accuracy and durability, is obtained. The air-fuel ratio of the mixture supplied to an internal combustion engine can be controlled as closely as possible to a theoretical air-fuel ratio by using such a device together with a fuel supplying installation.

What we claim is:

1. A device for detecting the air-fuel ratio of the mixture supplied to an internal combustion engine of the type including an exhaust gas recirculation system for recirculating a part of the exhaust gas into an intake passage, said device comprising:

a bridge electric circuit consisting of four hot-wire electric resistance elements, each having an equal resistance value under the same ambient condition, the first and second elements being connected at the first terminal, the second and third elements being connected at the second terminal, the third and fourth elements being connected at the third terminal and the fourth and said first elements being connected at the fourth terminal, said first and third elements are located in an exhaust gas recirculation passage of said exhaust gas recirculation system and said second and fourth elements are located in an air passage, the temperature of the air in said air passage being maintained the same as that of the exhaust gas flowing through said exhaust gas recirculation passage, an electric power means connected to one pair of terminals, the first and third terminals or the second and fourth terminals, for supplying an electric current to said bridge electric circuit, and;

a detecting means connected to the other pair of terminals, for detecting the changes of the electric current flowing between said other pair of terminals.

2. A device as set forth in claim 1, wherein said air passage is formed around said exhaust gas recirculation passage.

3. A device as set forth in claim 1, wherein each of said first and third hot-wire resistance elements, located in said exhaust gas recirculation passage, is coated with anti-corrosive material, such as a ceramic, so as not to be corroded by the exhaust gas in the exhaust gas recirculation passage.

* * * * *